Figure 1:
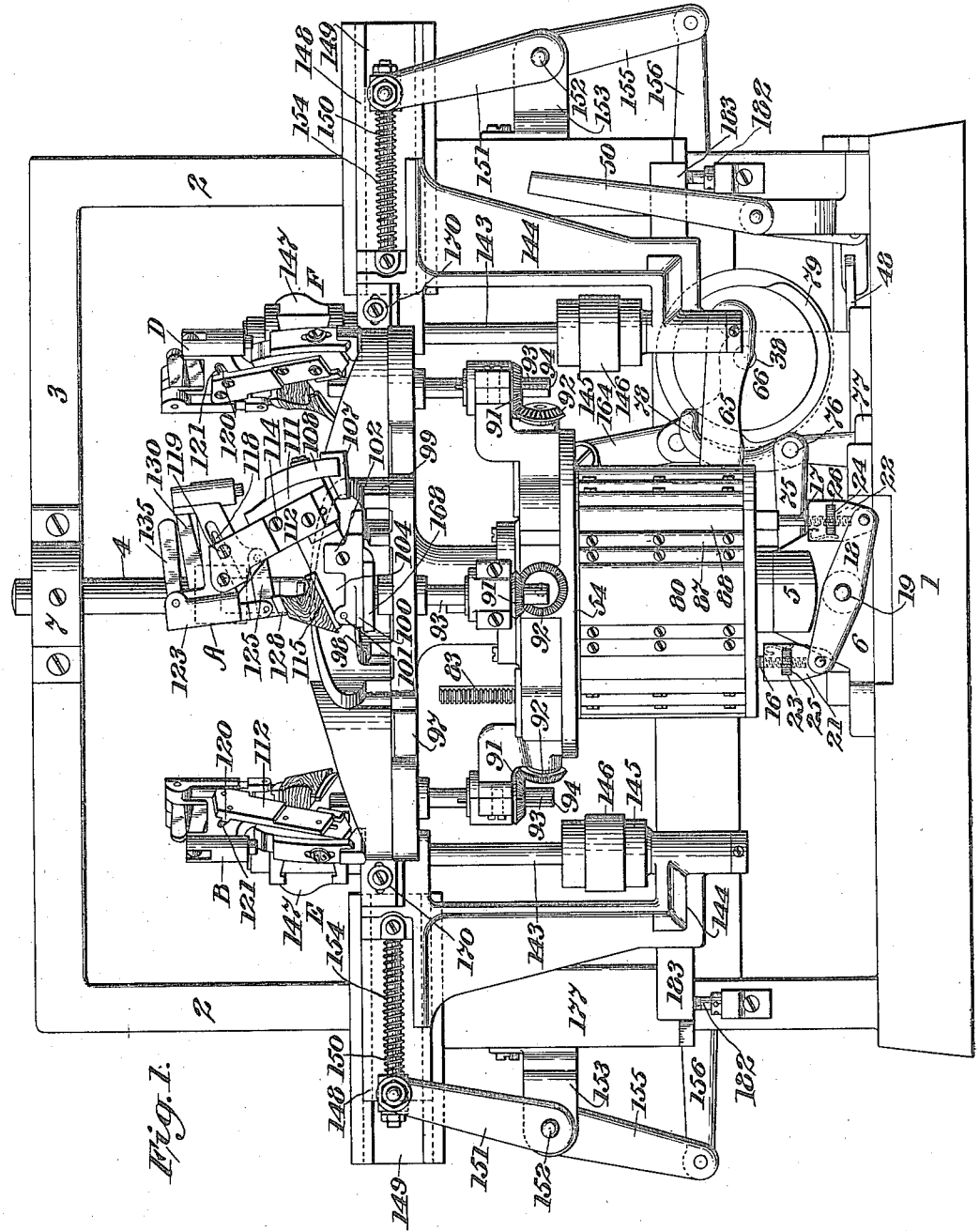

J. G. POOL.
MACHINE FOR MAKING HEELS FOR BOOTS AND SHOES AND THE LIKE.
APPLICATION FILED JULY 22, 1916.

1,238,815.

Patented Sept. 4, 1917.
7 SHEETS—SHEET 1.

Inventor
John George Pool
by
W. H. Timmel
Atty.

J. G. POOL.
MACHINE FOR MAKING HEELS FOR BOOTS AND SHOES AND THE LIKE.
APPLICATION FILED JULY 22, 1916.

1,238,815.

Patented Sept. 4, 1917.
7 SHEETS—SHEET 3.

Inventor
John George Pool
by
Wm. N. Finuel
Atty.

J. G. POOL.
MACHINE FOR MAKING HEELS FOR BOOTS AND SHOES AND THE LIKE.
APPLICATION FILED JULY 22, 1916.
1,238,815.
Patented Sept. 4, 1917.
7 SHEETS—SHEET 4.
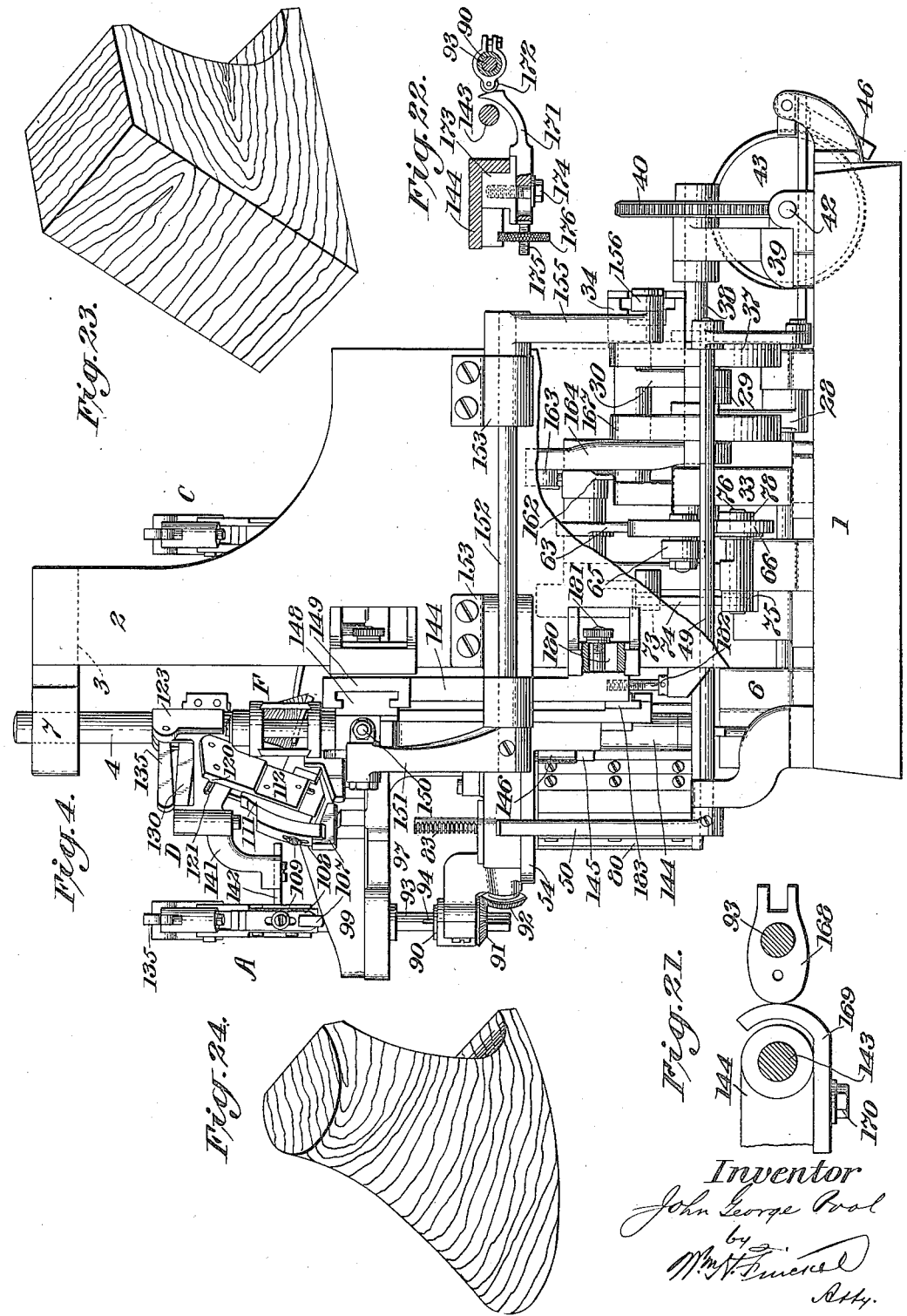

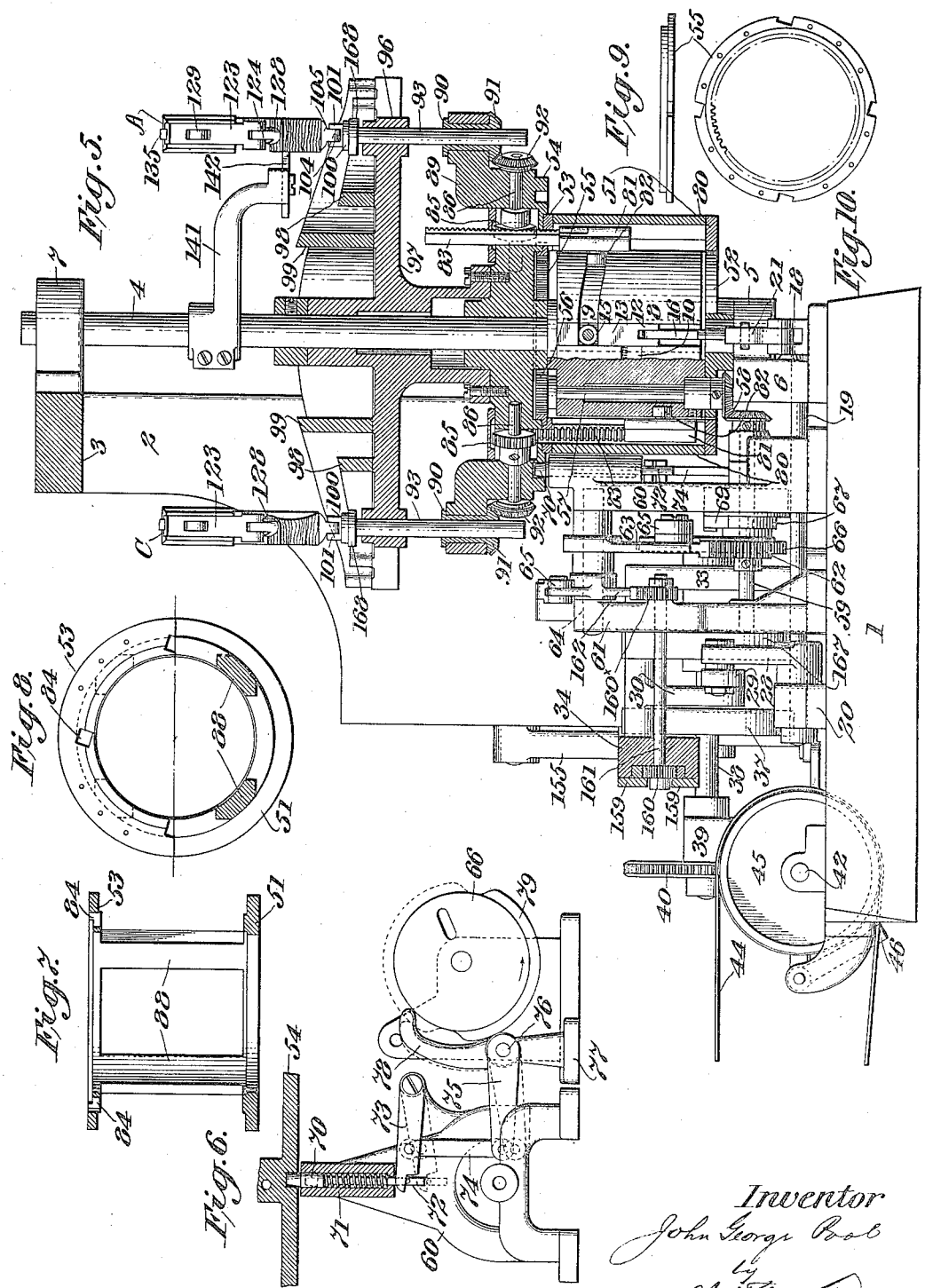

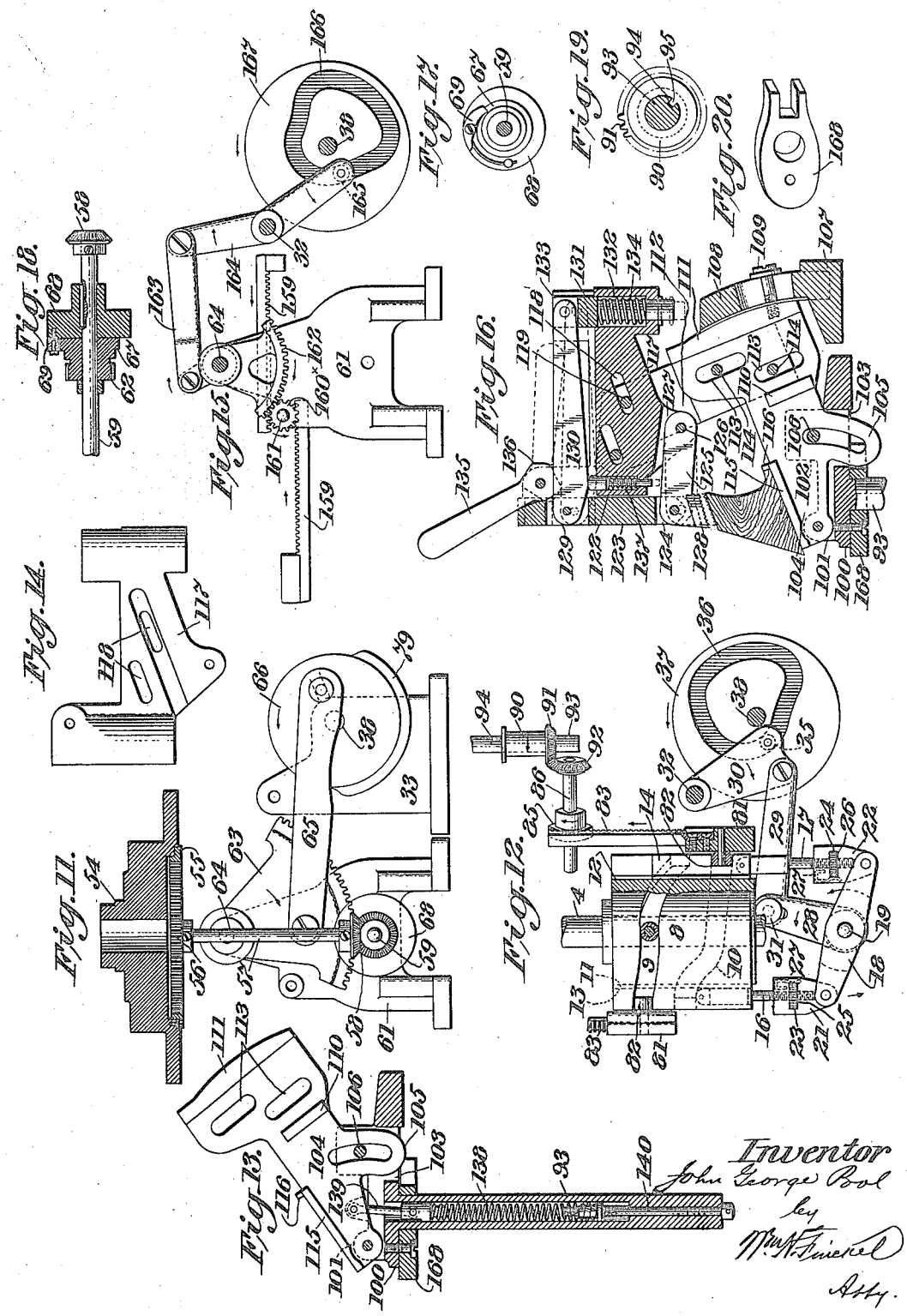

J. G. POOL.
MACHINE FOR MAKING HEELS FOR BOOTS AND SHOES AND THE LIKE.
APPLICATION FILED JULY 22, 1916.

1,238,815.

Patented Sept. 4, 1917.
7 SHEETS—SHEET 7.

Inventor
John George Pool
by W. N. Finkel
Atty.

UNITED STATES PATENT OFFICE.

JOHN GEORGE POOL, OF LYNN, MASSACHUSETTS.

MACHINE FOR MAKING HEELS FOR BOOTS AND SHOES AND THE LIKE.

1,238,815.  Specification of Letters Patent.  Patented Sept. 4, 1917.

Continuation of application Serial No. 28,465, filed May 15, 1915. This application filed July 22, 1916. Serial No. 110,745.

*To all whom it may concern:*

Be it known that I, JOHN GEORGE POOL, a citizen of the United States, residing at Lynn, in the county of Essex and State of Massachusetts, have invented a certain new and useful Improvement in Machines for Making Heels for Boots and Shoes and the like, of which the following is a full, clear, and exact description.

The object of this invention is to provide an improved machine for making or turning wooden heels for boots and shoes, expeditiously, accurately and economically with the least possible manual labor or supervision on the part of the operative, and in a practically automatic manner.

By the term "finished heel" as hereinafter used it is to be understood that I do not mean a heel wholly ready to be applied to a boot or shoe, but one that has the outside contour or form properly shaped.

The invention consists of a machine primarily designed for turning wooden heels for boots and shoes, but obviously adaptable for turning other objects of more or less irregular form, in which a carrier, such as a turntable, supports a jack in which the heel blank is held or secured, and which jack is automatically given such motions that the blank will be so presented to a cutter that one side will be shaped, the cutting beginning at the breast portion of the heel and extending thence to the back of the heel, and then the jack will be so turned that the opposite side of the heel will be presented to the cutter, and that side likewise cut from breast to back, as I will proceed now to explain and finally claim.

While the invention is not limited to the use of any particular number of jacks, still in the interest of economy and quantity of production, a machine having three or more jacks is preferred; three jacks being sufficient to allow the opposite sides of two heels to be presented to the cutter-heads and a new block to be inserted in the third jack simultaneously. However, I prefer to use four jacks as this number allows the spindles to be more easily arranged to be driven by a belt, and it is possible to present one jack to the cutter and to have one side of the blank cut, and then advance that jack through periods to the other cutter and present the reverse side of the blank to that cutter to have that side cut and then advance to a position to discharge the thus cut heel and receive a fresh blank, the three jacks following being respectively one at the second cutter, another at an intermediate rest point and the other at the first cutter, there being simultaneously a jack in operative conjunction with each cutter and another jack ready to receive a fresh blank.

A machine embodying four jacks, more or less, but in which each of the jacks has a series of identical motions, is shown in my copending case Serial No. 28,465, filed May 15, 1915, of which this case is a continuation, and the jacks therein shown form the subject of my copending case Serial No. 61,682, filed November 15, 1915.

The illustration and description of the invention herein are in a large measure reproductions of the corresponding parts in the first-named case above mentioned.

Figure 2:
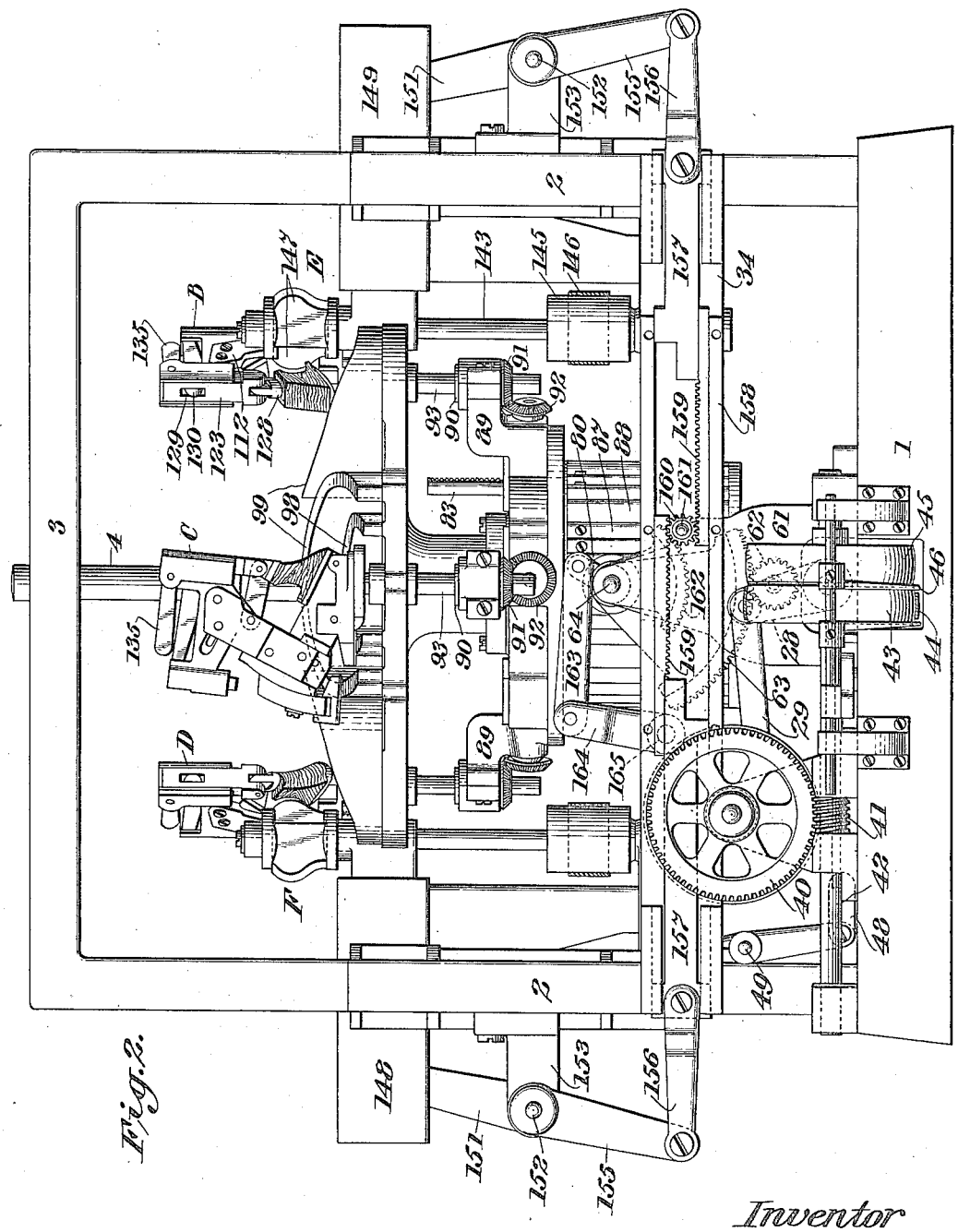
Figure 3:
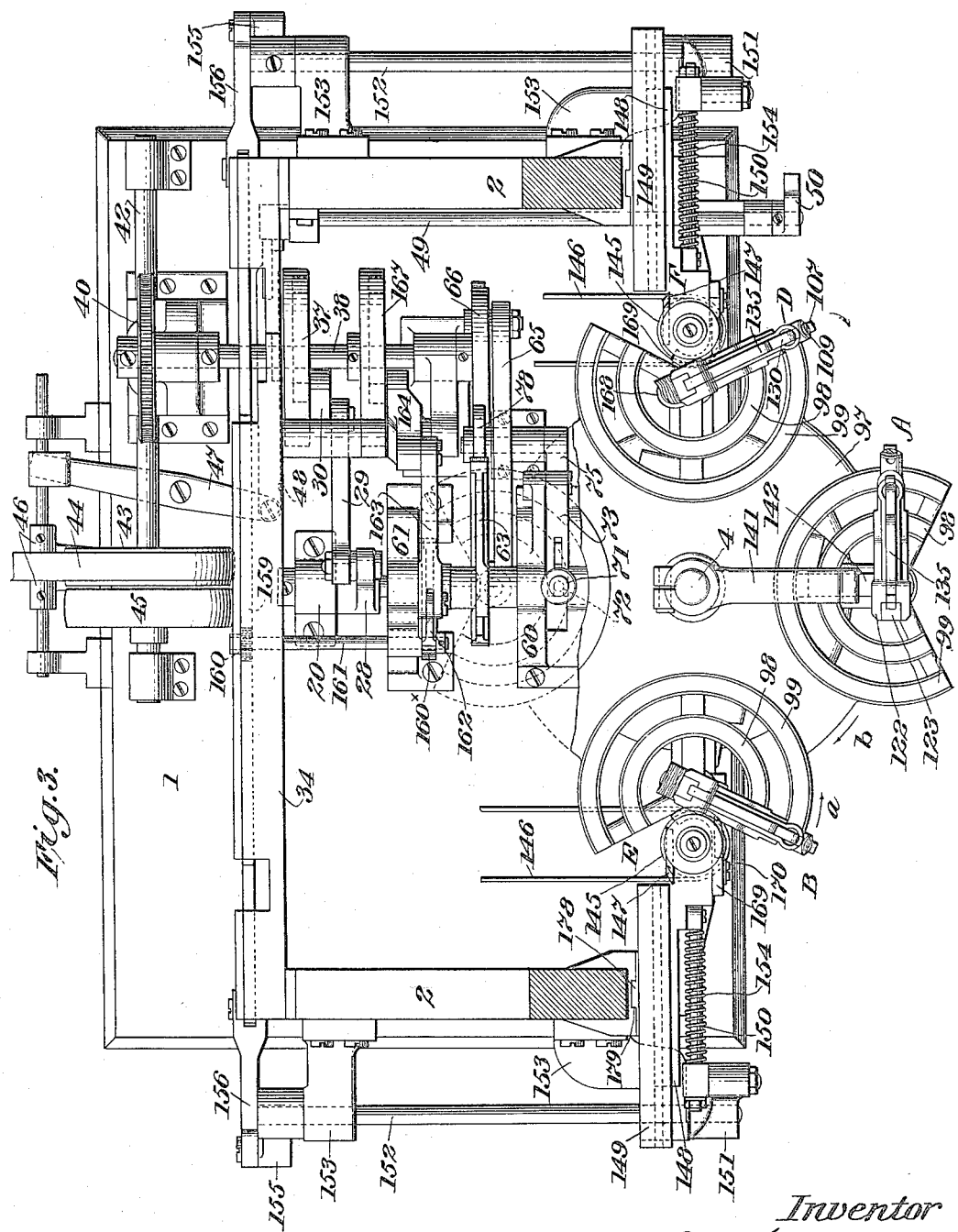
Figure 25:
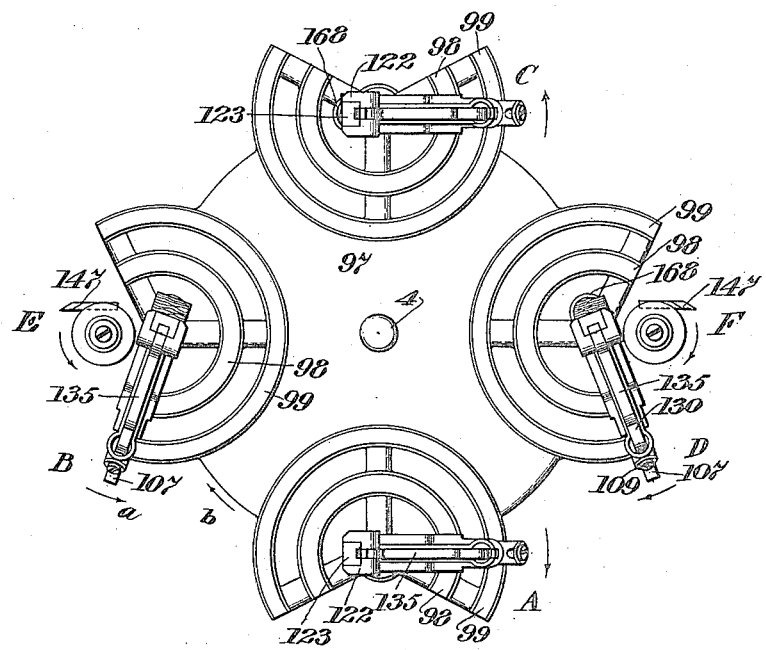
Figure 26:
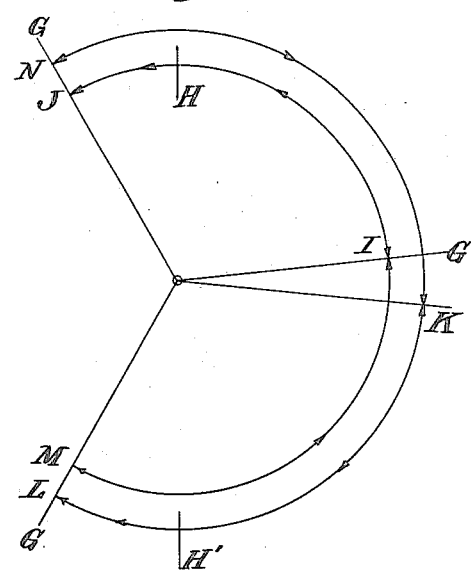

In the accompanying drawings illustrating the invention, in the several figures of which like parts are similarly designated, Figure 1 is a front elevation illustrating a four-jack machine in which the jack in the foreground has a heel blank in position and a jack to the left has a heel blank about to be cut on one side and the jack to the right has a heel blank about to be cut on the other side. Fig. 2 is a rear elevation showing the same disposition of the jacks. Fig. 3 is a top plan view with the upper part of the frame of the machine removed, the jacks being in the same positions as in Figs. 1 and 2. Fig. 4 is a right-hand end elevation. Fig. 5 is a left-hand end elevation, showing the turret and its associated parts and some other parts in vertical section. Fig. 6 is a detail in elevation and section showing the means for holding the turret while a blank is being trimmed or turned. Fig. 7 is a vertical section and Fig. 8 is a half top plan view and horizontal section of the turret cage detached. Fig. 9 is an elevation and Fig. 10 is a plan view of the internal gear for rotating the turret. Fig. 11 is a partial side elevation and section illustrating the turret-turning mechanism. Fig. 12 is a detail partly in section and partly in elevation, illustrating the mechanism for actuating the jacks. Fig. 13 is a partial section and elevation illustrating a hold-down for the jacks. Fig. 14 is an elevation of one of the jack heads detached. Fig. 15 is an elevation and partial section illustrating the mechanism for moving the cutter-heads. Fig. 16 is a partial vertical section of one of the jacks. Fig. 17 is an elevation of a ratchet mechanism forming part of the turret-turning mechanism, and Fig. 18 is a section of the same. Fig. 19 is a cross-section of a jack-spindle and its attached gear. Fig. 20 is a perspective view of a jack cam for coöperation with the cutter-head. Fig. 21 is a horizontal section illustrating the jack cam and the coacting part of the cutter-head. Fig. 22 is a horizontal section showing in elevation, partly broken out, a preliminary cast-off for the cutter-head. Fig. 23 is a perspective view, on a larger scale, of a wooden heel blank to be turned, and Fig. 24 is a perspective view of the turned heel which is one form of the product of the machine of this invention. Fig. 25 is a plan view of the turntable and jacks of a four-jack machine. Fig. 26 is a diagram illustrative of the cycle of motions of one jack.

It is to be understood that the invention is not limited to the precise structure herein shown and that variations are permissible within the principle of the invention, and with this reservation, I will proceed now to explain the principle of the invention as embodied in the machine illustrated in the drawings.

1 is a bed plate upon which the various parts of the machine are erected. 2 are two uprights fixed to the bed plate and connected at top by a cross-piece 3. A vertical stationary shaft or spindle 4 is mounted at its bottom in a step 5 on a bracket 6 fixed to the bed-plate and in a bracket 7 at its top, said bracket 7 being fixed to the cross-piece 3. To this shaft is fixed a stationary cam 8 (Fig. 12) having the cam-grooves 9 and 10 arranged upon opposite faces of the cam and at different altitudes and each extending half-way around the cam and intersected at diametrically opposite points by vertically disposed grooves 11 and 12 in which are placed slides 13 and 14 each of which has a transverse groove 15, Figs. 5 and 12, said transverse grooves being located near the upper end of one slide and near the lower end of the other. These slides are connected by links 16 and 17 with a rock-lever or walking-beam 18 fixed to a shaft 19 which is mounted in the bracket 6 and the bracket 20 fast on the bed-plate, so that as the rock-lever is vibrated one slide will be raised to bring its groove 15 into alinement with the upper cam groove 9 and the other will be lowered to bring its groove into alinement with the lower cam-groove 10, as shown in Fig. 12. The links 16 and 17 are set in sockets 21 and 22 pivotally mounted upon the rock-lever 18, and said links are screwthreaded and engaged by nuts 23 and 24 set in transverse slots 25 and 26 in these sockets 21 and 22, or any other suitable means of adjustment may be used so as to secure variation in effective length of the links in order to properly adjust the slides in their grooves in the cam and thereby insure correct register of their transverse grooves with the cam-grooves in the cam. The nuts 23 and 24 may be held in adjusted position by any suitable means, such as spring-dogs or fingers 27 engaging the milled or knurled rims of the nuts. The rock-lever 18 is actuated by an arm 28 fixed on the shaft 19, and adjustably connected by a link 29 with a vibrating crank-arm 30, the adjustment being effected by any suitable means such as a slot and set screw connection 31. The crank-arm 30 is suspended from a stationary shaft 32 supported in the bracket or stand 33 and the horizontal bar 34 supported upon the uprights 2, and its lower end is provided with a roller 35 opposite the point of attachment of the link 29, which roller engages a cam-groove 36 in a rotary cam-disk 37 mounted to turn with the driven shaft 38, which is mounted in the bracket or stand 33 and the bracket or stand 39, and is driven by a worm-wheel 40 engaged by a worm 41 on the driving shaft 42. Power may be applied to the driving shaft 42 in any suitable way, as by pulley 43 and belt 44, the shaft being also supplied with a loose pulley 45 and a belt-shifter 46. As shown, this belt-shifter 46 may be connected with a lever 47 connected by a link 48 with a rock-shaft 49 extending from the back of the machine to the front and provided with an operating lever 50.

Surrounding the cam 8 is a turret-cage 51, having its bottom closed by a plate 52 made fast to the shaft 4 and having a top ring 53 rigidly connected with a plate 54 so that the cage and plate may be turned together. This conjoint turning of the cage and plate may be effected in any of a variety of ways, and as here shown, these parts are provided with an internally toothed ring 55 fixed to the plate and engaged by a pinion 56 mounted upon the shaft 57 having its bearing in the cam 8 and at its lower end connected by bevel gears 58 with a shaft 59 which is mounted in the brackets or stands 60 and 61 erected on the bed-plate 1, said shaft 59 being provided with a gear wheel 62 (Figs. 5 and 18) which is engaged by a toothed segment 63 mounted upon the shaft 64 held stationary in the tops of the brackets or stands 60 and 61. Said toothed segment 63 is vibrated by a link 65 which is eccentrically pinned to a disk 66 fast on the shaft 38. The gear wheel 62 has fixed to it a ratchet 67 and the gear wheel and ratchet turn loosely together on the shaft 59, and there is fixed to the shaft 58 to turn with it a ratchet disk or pawl carrier 68 having a pawl 69 which engages the ratchet 67 so that when in the proper travel of the toothed segment 63 the gear wheel 62 is turned, the ratchet 67 will be engaged by the pawl 69 and consequently the shaft 59 will be turned. On the reverse motion the shaft is at rest. The toothed segment is arranged to impart periodically to the cage and its plate a rotary movement equivalent to the circumferential spacing of the jacks, and this in order to advance the work as required and hereinafter explained. In the intervals of rest the cage and plate are held stationary by means of a spring locking-dog 70 (see Fig. 6) arranged in a socket 71 forming part of the stand 60. This locking-dog 70 has an extension 72 which is engaged by a finger 73 which in turn is connected by a link 74 with an arm 75 which may be fixed to a shaft 76 mounted in a bracket 77, the other end of the shaft 76 having attached to it a locking cam lever 78 which is engaged by a cam 79 on the disk 66 by which the link 65 which actuates the toothed segment 63 is actuated. The cam 79 serves to throw back the cam-lever 78, as shown in dotted lines in Fig. 6, so as to withdraw the locking-dog 70 from the plate 54 at a time when the gearing in its motion should start to rotate the plate, and when this period of rotation is ended the cam 79 passes beyond the cam-lever and allows said cam-lever to drop toward the lower surface of the disk, thus releasing the arm 75, link 74 and finger 73 and permitting the spring to act upon the dog to throw it into locking relation to the plate.

The cage 51 is provided with suitable slideways 80 in which are mounted the slide blocks 81 each of which has a roller 82 which is normally engaged in one or the other of the cam-grooves 9 and 10. These blocks 81 have secured to them the vertically arranged toothed rack-bars 83 which extend up through openings 84 in the top of the plate 53 of the cage and the rim of the gear 55, and these bars engage pinions 85 on shafts 86 horizontally mounted in the plate 54. As the cage and plate are revolved about the cam 8, the roller 82 on the block 81 engages the slot in the slide 13 when this slide is at its highest elevation and is carried downward by this slide through the operation of the walking-beam 18 until it registers with the highest point of the lower cam groove and follows it while the cage is turning, so that the block gradually falls in following the cam groove, and then when the roller has reached the lowest elevation of this cam-groove, the rock-lever 18 has been caused to move so as to lower the slide 14 and put its cross-groove into alinement with the lowest point of the lower groove, and thereupon the block whose roller is in the groove is transferred to the slide 14 and the block and its rack bodily moved from the lower groove to the upper groove. Meanwhile, the movement of the rack causes the shaft 86 to turn and this will give the proper turning movement to the jack as will presently appear. At the time when one of the slides has been moved upward to elevate the block and rack, the slide at the opposite side of the cam is being lowered so as to transfer the block on the opposite side from the high point on the upper cam-groove to the high point on the lower cam-groove, and in so doing the rack-bar is operated to turn the shaft with which it is connected in the reverse direction from the direction of rotation imparted by the rising rack-bar at the other side, as described. By these movements of the rack-bars, the jacks that are opposite the cutter-heads for the time being are so turned that one side of the heel blank in one of the jacks will be presented to the first cutter-head to be cut, and the opposite side of the heel blank in the opposite jack will be presented to the opposite cutter-head to be cut. During the time when these vertical slides 13 and 14 in the stationary cam 8 are active to move the slide blocks 81 and rack-bars 83 to which they may be temporarily engaged, the turret remains stationary, and when their motion ceases the turret begins to turn and the cam rolls on the blocks 81 are all caused to follow the grooves in the stationary cam 8 during the time while the turret is rotating, the slides 13 and 14 have passed idly back to their first position, and receive the roller 82 of the following slides 81 as the turret is again brought to rest and these slides 81 will now be caused to partake of the same motion as was formerly given to the previous pair and so that they will be consecutively operated.

The above described cycle of motions is such as would take place with the parts arranged as shown in the drawings, but obviously the precise order of these movements may be changed without departing from the spirit and intent of this invention. For example, if the racks were arranged to operate on the opposite side of the gears with which they mesh, or the turret were revolved in the opposite direction, the above order of motions would be reversed in order to impart the correct motion to the jacks. The end to be attained by this mechanism is, that the jacks shall be given through the medium of the slides 13 and 14, the proper motions to enable the revolving cutter-heads to correctly form the heels, while the turret is stationary and locked, and when this operation is completed the turret is unlocked and rotated to bring the following pair of jacks to the cutter-heads. During this movement of the turret, the cam rolls on the slides 81 working in the slideways 80 on cage 51 are all engaged in the circular cam-grooves 9 and 10 in the stationary cam 8, and this motion of the turret through the medium of these cam-grooves, causes the jacks to swing on their own axes in such way that all of the jacks are properly placed for beginning a new cycle when the turret comes to rest. Briefly stated, this mechanism permits the heel to be turned while the turret is at rest, while all of the jacks are re-positioned while the turret is in motion.

The slideways 80 are removably applied to cheek-pieces 87 which are attached to the uprights 88 of the cage, so that ready access may be had to the mechanism within the cage.

The plate 54 as here shown, has arms 89 corresponding in number to the number of jacks employed, and projecting upwardly and outwardly therefrom and bored vertically, and formed as bearings to receive the hubs 90 of the beveled gears 91 which mesh with beveled gears 92 on the shafts 86. These hubs receive and turn the jack-spindles 93 which have the long key-ways 94 (Figs. 1 and 19) which engage keys 95 on the hubs and permit of the longitudinal movement of the spindles in said hubs as well as compel the conjoint turning of the two under the bevel-gear drives. Or any other suitable means for securing rotary motion from the gears while permitting longitudinal movement of the spindles may be employed. The spindles 93 have upper bearings 96 in a table 97 arranged above the plate 54 and mounted to turn on the shaft 4, and with the plate 54 being rigidly fixed to this plate in any suitable way, as by screws, see Fig. 5. The table is provided with the circular cam-tracks 98 and 99 arranged concentrically one within the other, and extending about 240 degrees so as to leave a clear opening for the swinging of the jack to properly present the stock to the cutter-heads which move toward them. These cam-tracks are interchangeable and designed to be exchanged for others differing in pitch to suit various forms of heels.

The cage and its contained parts, the superposed plate 54 and the table 97, make up the turret or turntable herein referred to although I do not limit myself to this construction in detail.

On the spindles 93 are jacks A, B, C, D, fast to and turning with them, and as these jacks are identical a description of one will suffice for all. As will be seen most fully by reference to Fig. 16, the jack-spindle 93 has formed on or applied to it a base-plate 100 whose outer end travels on the cam-track 98, and this base-plate is made or provided with the pair of parallel ears 101 at or near one end, and a pair of parallel lugs 102 about at its center, and a slot 103 beneath the lugs. Pivoted between the ears 101 is a lever 104, having a depending longitudinally slotted segment 105 which works in the slot 103 and between the lugs 102 and is pinned to the lugs by a pin 106 extending through the slot in the segment. This lever has applied to its outer end a cam-follower or shoe 107 which travels upon the cam-track 99 and is made adjustable up and down upon the lever 104 by means of a longitudinally slotted shank 108 and screw 109 or other suitable means, so that the lever and its superstructure may be arranged at the proper angle or elevation. The lever is provided upon opposite sides with the transverse guides 110 and 111, and between these guides are the upright cheek-pieces 112 adjustably secured to the lever as by slots 113 and screws or bolts 114. On the inner end of the lever is the work-rest 115 having the end gage 116. Between the cheek-pieces is arranged the jack-head 117, which is adjustably held in between said cheek-pieces in any suitable way, as by the oblique slots 118 and bolts or screws 119. In order to hold the jack-head rigid and guide it in its adjustment in the cheek-pieces these cheek-pieces may be provided with the oblique lugs 120, Fig. 4, fitting in the grooves 121 in the head. By this means the jack-head may be adjusted longitudinally and vertically with relation to the jack-lever so as to conform to the style and height of heel-blank to be operated upon. The forward end of the jack-head is recessed at 122, Figs. 3 and 16, and in this recess is arranged vertically the plunger 123, the lower end of which is slotted at 124 to receive a clamping-shoe 125, the rear end of which is pivoted at 126 in a slot 127 in the jack-head, so as to insure the proper position of the clamping-shoe with relation to the blank. The face of the clamping-shoe may have any suitable means 128 for gripping the blank, serrations being shown as one such means. The upper portion of the plunger is slotted at 129 and in this slot the clamping-bar 130 is pivoted, the other end of said bar being pivoted to a recoil device 131 arranged vertically in a socket 132 in the rear end of the jack-head 117. This recoil device may be a plunger 133 supported in the socket by a coiled spring 134, and has a limited upward movement in the socket. A clamping-lever 135 is pivotally mounted in the jack-head above the clamping-bar near its front, and has the cam end 136 adapted to act upon the clamping-bar to move it and its attached plunger 123 and by its eccentricity to lock these parts in clamping position, the recoil device serving to compensate for variations in height in the blanks while sufficiently strong to effectively clamp the blank. Beneath the clamping-bar is a spring plunger 137 arranged in the jack-head and constantly pressing upwardly against said bar and serving to release the parts when the clamping lever 135 is released. It will be seen by reference to Fig. 16 that the fulcrum of the clamping-lever 135 is in vertical alinement with the jack-spindle and above it, so as to get a direct and supported thrust.

As will be seen, the jack members are well supported laterally and vertically and thus rendered sufficiently rigid to meet the strains to which they are subjected in use.

As shown in Fig. 13, the jack-spindle may be hollow and contain a tension-spring 138 reacting upon a rod 139 which is pivoted to the lower part of the jack-lever 104 and connected at its opposite end with an adjusting device 140 in the spindle so as to provide an adjustable downward tension for the jack, and, for convenience, this device is herein referred to as a hold-down.

As will be seen, the jack and its spindle may be bodily removed from the machine at pleasure.

At the front of the machine and fixed to the spindle or shaft 4 is an arm 141 having in it a side gage 142 and these parts are arranged opposite the point where the jack A is shown at rest, so as to aid the operative in properly placing a blank in the jack.

Two cutter-heads E and F are mounted at opposite points at the front of the machine, and these cutter-heads being alike, a description of one will suffice for both. A shaft 143 is mounted to turn in a bracket or frame 144, and is provided with a band pulley 145 to which is applied a band 146 which may extend to any suitable source of power. The shaft 143 may be rotated by any suitable means, but inasmuch as the cutter-heads must be driven at a greater speed than the turret or turntable, it will be most convenient to drive the shafts from an independent source of power. On the shaft 143 is the cutter-head proper 147, preferably provided with interchangeable blades so as to produce heels of the desired contour. The brackets 144 are provided with slide-blocks 148 which are mounted in the slideways 149 fast on the frame, and these slide blocks are connected by rods 150 with crank arms 151 mounted on shafts 152 borne in brackets 153 on the frame. Interposed between the blocks and the crank arms 151 are springs 154. The shafts 152 extend toward the rear of the machine and are provided with crank arms 155 which are connected by links 156 with slides 157 mounted in a guideway 158 in the bar 34, and these slide-blocks 157 are provided with rack-bars 159, one arranged above the other and spaced apart, Fig. 2, and these rack-bars are engaged by a pinion 160 on the shaft 161, one end of which is mounted in the bracket 61 and the other in the guideway 158. A rotary reciprocating motion is imparted to the shaft 161 by means of the toothed segment 162 engaging pinion 160ˣ and mounted on the shaft 64 and connected by a link 163 with a rocker-arm 164 mounted to turn on the shaft 32, the lower end of said rocker-arm having a roller 165 which engages a cam-groove 166 of a cam 167 on the shaft 38, so that as the turret is revolved and the jacks successively brought into position with relation to the cutter-heads, these cutter-heads are advanced toward the jacks then opposite them, while they are caused to move away from the jacks as the jacks move away from them.

In order to maintain the cutter-heads in proper relation to the jacks during the cutting operations, each jack spindle is provided with a cam 168 which comes into contact with a buffer 169 fixed to the bracket 144 in which the cutter-head is mounted. This buffer may be made adjustable toward and from the cam 168 by means of a set-screw and slot 170 in order to get the correct relationship between the cutter-head and the stock or heel blank. The springs 154 provide elastic means to hold the cutter-heads up to their work on the heels being turned, while at the same time due motion may be allowed to permit the buffers 169 to remain in contact with and follow the contours of cams 168 on the jack spindles in order to produce the proper form of heel. These cams 168 are interchangeable for different forms of heels.

In cutting the blank to shape, the work of cutting begins at the breast of the heel and proceeds along one side to a middle line at the back, in the direction of the grain of the wood, and in order to prevent the formation of a ridge at the back where the two cutter-heads end their work, the cutter-heads may be given an auxiliary movement away from the jacks at about the time the centers of the backs of the heels are presented to the cutter-heads, and this may be effected by an adjustable cam arm 171 applied to each of the brackets 144 carrying the cutter-heads and extending somewhat beyond and in front of the cutter-head shafts into a position between the cutter-head shafts and the jack spindles, and the hubs 90 of the jack-spindle gearing may be provided with roller cam-arms 172 which will come into contact with the cam-arms 171 and thereby serve to slightly back off the cutter-head brackets and so remove the cutter-heads slightly and gradually back from contact or control of the cam 168, Fig. 20, after the center of the back of the heel is reached, and as this occurs at each cutter-head and on both sides of the heel, the cuts do not overlap at this point and no ridge is formed. The jacks are given a motion of about fifteen degrees past the center on each side at this point.

The adjustment of each cam-arm 171 is indicated in Fig. 22, and as there shown, this arm may be secured to the block 173 by a slot and screw 174 and moved longitudinally by a screwthreaded tail-piece 175 engaged by a fixed nut 176.

The slideways 149 may be secured to the frame in any suitable manner, but it is preferred to secure them to uprights 177, and these uprights may be secured to the frame in a vertically adjustable manner by means of the tongue and groove members 178 and 179, respectively, Fig. 3, and the adjustment fixed by the slots 180 in the frame and the clamping-screws and nuts 181, Fig. 4; the uprights having been first properly adjusted by means of adjusting-screws 182. Inasmuch as the brackets 144 are of considerable height and have both top and bottom bearings for the shafts 143, it is preferred also to provide bottom slideways 183 in addition to the upper slideways 149.

As already indicated, the machine of this invention is automatic, excepting as to the placing and removing of the work, and these operations are simplified to a very great extent, the end gage on the work rest and the stationary side gage 142 admitting of quick and easy proper adjustment into position of the fresh blank by the operation of the cam lever. The side gage is an impossibility in the machines that are now in common use, and because of this fact, manufacturers have had to use blanks or stock of larger size and consequently more expensive and wasteful, in order to allow for improper setting in the machine. It will be understood that the operative must rely entirely upon his own judgment and skill in setting the blanks or stock without such side gage, but using the side gage in the place indicated enables me to economize in stock and very materially increases the output of the machine. Practically the machine may be run as rapidly as an operative can remove the finished blank and replace it by a fresh blank. The machine is always acting upon two blanks, one of which is being given its first cut on one side, and another its final cut on the other side, while the operative is simultaneously placing a new block in place of a finished heel. At each quarter turn of the turntable a finished blank is presented to the operative at the front of the machine, the turntable coming to rest while the cutter-heads are operating upon two blanks previously in the machine. In other words, the machine may always have four blanks in its jacks, two of which are being operated upon simultaneously by the cutter-heads.

Assuming that the machine is in the position shown in Figs. 3 and 25, the jack A will be in position to discharge a finished blank and receive a fresh blank. The jack B is presenting its blank to the cutter-head and meanwhile its gearing 91 and 92 is operating so as to swing the jack in the direction of the arrow $a$ shown in Figs. 3 and 25, and cause it to ride up upon the cam tracks 98 and 99, so that the jack and consequently the blank is being inclined relatively to the cutter-head as the blank is turned from the breast toward the back. When the blank and the jack parts have gained this position, then the cutter-heads begin to recede, the turntable is released from its locking-dog or bolt 70 and begins to turn around in the direction of the arrow $b$, so as to carry the jack B away from the cutter-head and to carry the jack A toward the cutter-head. As the turntable moves the necessary quarter turn in order to bring the jack A into operative position with relation to the cutter-head E, the jack B has continued its motion in the same direction over its cam tracks and when the turntable again moves a quarter turn in order to bring the jack B opposite the cutter-head F, the movement of the jack B in the same direction will be completed and then the jack will be so turned as to present the opposite uncut side of the blank to the cutter-head F, and that cutter-head then acts upon that side of the blank while the jack reverses its movement up the cam-tracks 98 and 99 until the jack reaches the high points of the cam-tracks and the blank is cut. At this time the turntable is again released, and all of the various jacks are advanced a quarter turn, the jack B being moved into a position opposite the side gage 142 and run down the cam-tracks 98 and 99 so as to present the front of the jack in proper position to receive a fresh blank. Now while the blank in jack B has been under operation by the cutter-head F, the blank in jack A has been advanced three-fourths way around and into position to come into coöperative relation with the cutter-head F after the jack B has been moved away from the cutter-head to the front of the machine. The course, therefore, of a single jack is, first, to receive a fresh blank, next to present it to the first adjacent cutter-head where one side is cut, then to move to a point between the cutter-heads, then presenting the blank to said second cutter-head, and finally righting itself and presenting the finished blank to the front of the machine for removal from the machine. So also, if there are four jacks, each one of them is undergoing some operation throughout the entire cycle of movements.

During the time that the cutter-heads are simultaneously operating upon opposite sides of the two blanks presented to them, and while the jacks containing these blanks are advancing upward to the high points of the cam-tracks, the intermediate jacks are substantially at rest, and this because the rollers on the slide-blocks 81 are in the dwell points of the cams 9 and 10. While the heels are being acted upon by the cutter-heads and the turntable is stationary, the slides 13 and 14 are being shifted one up and the other down, so that when the turret again turns to advance the jacks a quarter turn, each of these slides will be in position to permit a transfer of one rack from the higher to the lower cam-groove in the stationary cam 8 and to transfer the other from the lower to the higher, in order to effect the proper movement of the respective jacks. These positions of the slide-blocks and rack-bars are shown in detail in Fig. 12.

It will be understood that each jack has two distinct motions, one imparted by the turning of the turntable or jack-carrier, and the other imparted by the rotary reciprocating motion given to the jack spindle. The motion of the turntable or carrier is in one direction and intermittent and proceeds step by step to advance the jack from one station to another, and the rotary reciprocating motion of the jack on the turntable or carrier serves to present first one side and then the other side of the heel to the cutter so as to be cut, in both instances from breast to back, the progressive movement of the jack while juxtaposed to the cutter occurring when the turntable or carrier is at rest and the reverse movement occurring while the turntable or carrier is in motion. These series of motions are more particularly apparent by an inspection of Figs. 25 and 26, and they are incident to each jack, and, hence, should a many-jack machine have one or more of its jacks disabled or otherwise put out of commission, the machine may be run with the remaining jack or jacks until the other or others is or are renewed and replaced.

All of the functions of the machine, so far as all of its operations are concerned, are capable of being performed with only one jack on the turntable, and the addition of other jacks is primarily for the purpose of rendering the machine rapid in production and more satisfactory from a manufacturing and commercial standpoint.

Referring to the diagram, Fig. 26, the lines G represent the positions of the jack at the points where its various motions begin and end, and the lines H and H' represent the positions of the jack when it is held stationary. These points of arrest of movement of the jack might be arranged to come at other points between I and J or K and L, but the diagram as drawn shows the points of arrest as the same are shown in the other views in the drawings, the point H' being the point at which the work is inserted and removed, although this would occur at H if the turntable revolved in the opposite direction. Supposing the turntable be started to rotate with the jack at H', the jack will, during this movement of the turntable, be caused to turn to point L, and when this point is reached by the jack, the turntable will be locked against further movement automatically and the jack motion reversed so that the jack will move up its cam track from M to I, so as to present the work to the cutter and permit the cutter to act upon the blank from the breast portion to the back. When the back of the heel is reached and the jack has arrived at the point I, the turntable is released and begins to continue its rotation in the same direction indicated by the arrow b, and meanwhile the jack continues to move in the same direction and from I to H, reaching which latter point it remains stationary until the turntable is again rotated, when the jack again moves in the same direction to J. When this point is reached the turntable is held stationary and the jack is rotated in a reverse direction from N to K, and then the turntable is rotated and the jack moves in the same direction from K to H', when the turntable is again held stationary and the jack stationary, when this cycle is again repeated.

What is said of one jack in connection with this diagram is equally true of all of the jacks when a plurality of jacks are used, but if only three jacks are used, then each would not stop at point H but would swing continuously from N to K, since the table would not stop at this point.

It is designed that the jacks will be caused to move from M to I while the turntable is stationary, and then while the turntable moves through one fourth revolution the jack will be moved in the same direction over its tracks to H, where it remains stationary while the turret is stationary. While the turret is moving through the next quarter revolution the jack continues to move in the same direction until it arrives at the other end of its track at J. This jack has now arrived opposite the other cutter head and is positioned properly to present its other side thereto, and the turret is again held stationary. Now, while the turret is stationary, the motion of the jack is reversed and said jack is carried up its cam track from N to K, which causes the other side of the heel to be turned. The turret is now rotated one quarter revolution and the jack continues in this same direction to H', where the finished heel is removed and a new block inserted while both jack and turret are stationary. The turret is now rotated through its fourth quarter revolution, and the jack is rotated in the same direction to L, where it is again reversed while the turret is stationary, and this cycle is repeated.

Each and every jack partakes of these motions in regular consecutive order and the various jacks will be performing various phases of this cycle simultaneously, to the end, that a complete cycle may be completed by one of the jacks, on the completion of each movement of the turret or turntable.

The above cycle is for a four-jack machine, but with a three-jack machine the jacks would be spaced 120 degrees apart on the turntable, and there would be no stop of the jacks when going from the first cutter to the final cutter, but at each stop of the turntable two jacks will be presenting opposite sides of their blanks to the cutters simultaneously and the third jack will be in position to discharge the previously cut or turned blank and receive a fresh blank, and then this fresh blank will be presented to the first cutter in sequence as the blank last operated upon by it is presented to the final cutter. Of course, for a three-jack machine the stationary cam 8 and turret-cage 51 would be suitably designed to coöperate therewith.

It will be understood from the diagram that the work is being cut on one side while the jack is moving from M to I and that the other side of the work is being cut while the jack is moving from N to K.

The slides 81 shifting from one cam groove to the other in the stationary cam in opposite directions, cause their temporarily related jacks to rotate in relatively opposite directions while the turret is at rest and the work operated upon, and the cam grooves through the interposed series of connections cause the jacks to continue to rotate in the same direction while the turret revolves in order that each jack may be properly positioned when arriving at the cutter-head, at which point their direction of rotation is reversed, since at this time they are connected with means by which the slides are caused to move in the opposite direction to the other cam groove which they follow when the turret is rotated until the starting point is again reached, at which time the jacks will be properly positioned and again reversed with the beginning of a new cycle. As already indicated, the heel will be turned always from breast to back, while the turret is at rest, and the jacks will be brought to the proper starting position while the turret is in motion.

It will thus be seen that the motion of the machine is automatic, excepting for the putting in and taking out of the work, and consequently manual labor on the part of the operative is reduced to a minimum, and the manufacture of perfectly formed heels is carried on independently of the skill of the operative.

While I have shown the various gears as exposed, it will be understood that they will be cased-in or otherwise suitably covered so as to guard against accident to the operative.

It is to be understood that while the machine herein described was designed primarily for use in making wooden heels for boots and shoes, the invention is applicable to machines for manufacturing other articles, and also for making heels of other material, and the claims herein are to be understood accordingly.

What I claim is:—

1. In a machine for making heels for boots and shoes, a jack carrier having an intermittent rotary movement in one direction, a pair of rotary cutters or cutter-heads and means to move them toward and from the jack carrier, a jack mounted upon the jack carrier and having an axial rotation on said jack carrier, and means to automatically control the several movements, so that when the machine is running the said jack presents its contained blank to the first of the pair of cutters and rotates it from breast to back as the blank is in cutting relation to said cutter and while the carrier is stationary, the cutter upon completion of its work being moved away from the jack and the carrier resuming its rotation and the jack completing its axial rotation in the same direction, the carrier moving the jack to the second cutter of the pair of cutters and stopping so as to present the opposite or uncut side of the blank to said second cutter, the jack then rotating upon its axis in the opposite direction to permit the cutting of the then uncut side of the blank from breast to back, the jack and cutter then moving out of operative relation while the jack continues its rotation in the same direction and the carrier resumes its rotation for a definite period, and the carrier and jack stopping to permit the discharge of the heel and the insertion of a fresh blank upon which a like series of operations is performed.

2. In a machine for making heels for boots and shoes, a jack carrier having an intermittent rotary movement in one direction, a pair of rotary cutters and means to move them toward and from the jack carrier, a plurality of jacks mounted upon the jack carrier and having reversible axial rotation thereon, and means to automatically control the several movements, so that when the machine is running each of said jacks may be supplied in turn with a blank while the carrier and that particular jack are at rest, the several jacks in succession being presented to the first of the pair of cutters, each jack being rotated upon its axis while so presented and while the carrier is at rest so as to effect the cutting of one side of its blank from breast to back, the cutter upon completion of its work being moved away from the jack and the carrier resuming its rotation and the jack completing its axial rotation in the same direction, the carrier moving the jack to the second cutter of the pair of cutters and stopping so as to present the opposite or uncut side of the blank to said second cutter, the jack then rotating upon its axis in the opposite direction to permit the cutting of the then uncut side of the blank from breast to back, the jack and cutter then moving out of operative relation while the jack continues its rotation in the same direction and the carrier resumes its rotation for a definite period, and the carrier and jack stopping to permit the discharge of the heel and the insertion of a fresh blank upon which a like series of operations is performed, the jacks being simultaneously advanced one interval at a time and each of the jacks having similar motions and performing all of the functions described in regular consecutive sequence.

3. The combination with a stationary reaction device, of a jack-carrier, means to move it intermittently through predetermined arcs, a jack carried by said jack-carrier and capable of reversible axial rotation thereon, means by which the jack as it occupies a predetermined relative position on the jack-carrier may be axially rotated in one direction and means by which it may be axially rotated in the opposite direction as it occupies another predetermined relative position on the jack-carrier while the jack-carrier is at rest, and means controlled by the stationary reaction device to effect a further rotation of the jack in the immediately preceding direction for repositioning the jack while the jack-carrier is in motion.

4. The combination with a stationary cam, of a jack-carrier, means to move it intermittently through predetermined arcs, a jack carried by said jack-carrier and capable of rotary reciprocating motion thereon on its axis, and means for axially rotating said jack periodically while the jack-carrier is at rest and for effecting a repositioning of the jack while the jack-carrier is in motion.

5. The combination with an always stationary reaction device, of a jack-carrier, means to move it intermittently through predetermined arcs, a jack carried by said jack-carrier and capable of reversible axial rotation thereon, means by which the jack, as it occupies a predetermined relative position on the jack-carrier may be axially rotated in the desired direction while the jack-carrier is at rest, and means controlled by the stationary reaction device to effect a repositioning of the jack while the jack-carrier is in motion.

6. The combination with a stationary reaction device, of a jack-carrier, means to move it intermittently through predetermined arcs, a jack carried by said jack-carrier and capable of reversible axial rotation thereon, means by which the jack as it occupies a predetermined relative position on the jack-carrier may be axially rotated in one direction and means by which it may be axially rotated in the opposite direction as it occupies another predetermined relative position on the jack-carrier while the jack-carrier is at rest, means controlled by the stationary reaction device to effect a repositioning or resetting of the jack while the jack-carrier is in motion, and means to cut one side of a blank which is held in the jack from one point to another as it is rotated in one direction and then upon reversal of the blank by the reversal of motion of the jack to cut the opposite side of the blank beginning at a like point on said opposite side.

7. In a machine for making heels for boots and shoes, the combination of an intermittently rotating jack-carrier, a jack carried by said jack-carrier, means to impart a rotary reciprocating motion to said jack, a rotary cutter-head, yielding or elastic means to cause the cutter-head to advance toward the jack, and means to withdraw the cutter-head from the jack.

8. In a machine for making heels for boots and shoes, the combination of an intermittently rotating jack-carrier, a jack carried by said jack-carrier, means to impart a rotary reciprocating motion to said jack, and means to impart a vertical motion to the jack on the carrier.

9. In a machine for making heels for boots and shoes, the combination of an intermittently rotating jack-carrier, a jack carried by said jack-carrier and provided with adjustable work-holding elements arranged at an inclination to the carrier, means to impart a rotary reciprocating motion to said jack, means to impart a vertical motion to the jack on the carrier, and an adjustable follower engaging the jack and the last-named means to vary the angle of inclination of said work-holding elements on the carrier.

10. In a machine for making heels for boots and shoes, the combination of an intermittently rotating jack-carrier, a jack carried by said jack-carrier, means to impart a rotary reciprocating motion to said jack, a rotary cutter-head, a bracket or frame in which the cutter-head is mounted, means to adjust the bracket or frame vertically, yielding or elastic means to cause the cutter-head to advance toward the jack, and means to withdraw the cutter-head from the jack.

11. The combination of a rotary turret, a work-holding jack mounted on said turret and adapted to receive axial rotation thereon, means to intermittently rotate the turret in one direction to present the jack at different points in the cycle of movement, means operative when the jack occupies a predetermined relative position on the turret and during a rest interval of the turret to rotate the jack on its own axis in a given direction through a predetermined arc, means by which the axial rotation of the jack may be continued in the same direction through a predetermined arc while the turret is rotating to bring the jack to a new predetermined point in the rotation of the turret, means to hold the turret stationary at this point, means operative while the turret is stationary to rotate the jack on its own axis in a reverse direction through a predetermined arc, and means by which the axial rotation of the jack may be continued in this reverse direction through a predetermined arc while the turret is rotating to bring the jack again to its original point in the rotation of the turret and the jack to its starting position.

12. The combination of a rotary turret, a work holding jack mounted on said turret and adapted to receive axial rotation thereon, means to intermittently rotate the turret in one direction to present the jack at different points in the cycle of movement, means operative when the jack occupies a predetermined relative position on the turret during a rest interval of the turret to rotate the jack on its own axis in a given direction through a predetermined arc, means by which the axial rotation of the jack may be continued in the same direction through a predetermined arc while the turret is rotating to bring the jack to a new predetermined point in the rotation of the turret, means to hold the turret stationary at this point, means operative while the turret is stationary to rotate the jack on its own axis in a reverse direction through a predetermined arc, and means by which the axial rotation of the jack may be continued in this reverse direction through a predetermined arc while the turret is rotating to bring the jack again to its original point in the rotation of the turret and the jack to its starting position, said jack also being held stationary at a predetermined point in the cycle of movements of the jack while the turret is held stationary.

13. The combination of a rotary turret, a work-holding jack mounted on said turret and adapted to receive axial rotation thereon, means to intermittently rotate the turret in one direction to present the jack at different points in the cycle of movement, means operative when the jack occupies a predetermined relative position on the turret during a rest interval of the turret to rotate the jack on its own axis in a given direction through a predetermined arc, means by which the axial rotation of the jack may be continued in the same direction through a predetermined arc while the turret is rotating to bring the jack to a new predetermined point in the rotation of the turret, means to hold the turret stationary at this point, means operative while the turret is stationary to rotate the jack on its own axis in a reverse direction through a predetermined arc, means by which the axial rotation of the jack may be continued in this reverse direction through a predetermined arc while the turret is rotating to bring the jack again to its original point in the rotation of the turret and the jack to its starting position, said jack also being held stationary at a predetermined point in the cycle of movement of the turret and while the turret is stationary, a pair of cutter-heads adapted to coöperate with the jack, means by which a cutter-head may be advanced into operative relation to the jack when the turret moves the jack to the first position where the jack is rotated while the turret is stationary, means by which the rotation of the jack at this point causes the cutter-head to form one side of the heel from breast to back, means to withdraw the cutter-head from the jack, means to advance the other cutter-head to the jack when the jack has reached the second position where the jack is rotated while the turret is stationary, and means whereby the reversed motion of the jack causes the cutter-head to form the other side of the heel also from breast to back, and means to withdraw the cutter-head from the jack, the removal of the work and the insertion of a new blank being effected while the turret is stationary.

14. In a machine for making heels for boots and shoes, the combination with a suitable number of rotary work-holding jacks, and cutter-heads to operate upon the work in the jacks, of means for simultaneously presenting the cutter-heads and jacks in apposition to permit the cutter-heads to act simultaneously upon opposite sides of blanks in said jacks, and means to move the respective jacks successively so as to present one side of the heel blank to a cutter-head to permit it to be cut from breast to back with the grain and then to present the other side to another cutter-head likewise to be cut from breast to back with the grain, while a fresh blank is being acted upon by the first-mentioned cutter-head.

15. In a heel turning machine, the combination of a turret, a number of work-carrying jacks arranged on said turret, means to intermittently rotate the turret so as to present the jacks at different points in the cycle of movements, means operative during the rest intervals of the turret to axially rotate the individual jacks positively and independently as they occupy predetermined positions, one jack moving in one direction while another is moving in the opposite direction, and means for repositioning the jacks while the turret is in motion.

16. The combination of a stationary reaction device, a turret coöperating therewith, including a turntable adapted to rotate intermittently through predetermined arcs, jacks carried by said turntable and having independent and reversible axial rotation thereon, mechanism carried in part by the turret by which the jacks as they occupy predetermined relative positions on the turntable may be axially and oppositely rotated while the turret is at rest, and means by which the jack turning mechanism carried by the turret may be controlled by the stationary reaction device to effect the repositioning of the jacks while the turret is in motion.

17. The combination, of a jack-carrier, means to move it intermittently through predetermined arcs, a plurality of work-holding jacks carried by said jack carrier and capable of reversible axial rotation thereon, means by which the individual jacks consecutively are given predetermined relative positions on the jack carrier and then axially rotated while the jack carrier is at rest, means to effect the consecutive repositioning of the jacks while the jack carrier is in motion, and means by which the jacks as they consecutively arrive at a predetermined relative position on the jack carrier may be held stationary while the jack-carrier is stationary to permit the removal of the work and the substitution of a new blank whereby to produce a finished product at each movement of the jack carrier after all of the jacks are supplied with blanks.

18. The combination with a stationary cam, of a jack-carrier, means to move it intermittently through predetermined arcs, a jack carried by said jack-carrier and capable of rotary reciprocating motion thereon on its axis, and means for axially rotating said jack periodically first in one direction and then in the opposite direction, while the jack-carrier is at rest and for effecting repositioning of the jack while the jack-carrier is in motion.

19. The combination with a stationary reaction device, of a jack-carrier, means to move it intermittently through predetermined arcs, jacks carried by said jack-carrier and capable of reversible axial rotation thereon, means by which each individual jack as it occupies predetermined relative positions on the jack-carrier may be axially rotated first in one direction and then in the opposite direction while the jack-carrier is at rest, and means controlled by the stationary reaction device to effect repositioning of the jacks while the jack-carrier is in motion.

20. The combination of a jack-carrier, means to move it intermittently through predetermined arcs, a jack carried by said jack-carrier and capable of reversible axial rotation thereon, means by which the jack as it occupies predetermined positions on the jack-carrier may be axially rotated first in one direction and then in the opposite direction while the jack-carrier is at rest, means to effect a repositioning or resetting of the jack while the jack-carrier is in motion, and means to cut one side of a blank which is held in the jack from one point to another as it is rotated in one direction and then upon reversal of the blank by the reversal of motion of the jack to cut the opposite side of the blank beginning at a like point on said opposite side.

21. In a machine for making heels for boots and shoes, the combination of an intermittently rotating jack-carrier, a jack carried by said jack-carrier, means to impart a rotary reciprocating motion to said jack, rotary cutter-heads, yielding or elastic means to cause the cutter-heads to advance toward the jack, and means to withdraw the cutter-heads from the jack.

22. In a machine for making heels for boots and shoes, the combination of an intermittently rotating jack-carrier, a jack carried by said jack-carrier, means to impart a rotary reciprocating motion to said jack, rotary cutter-heads, a bracket or frame in which each cutter-head is mounted, independent means to adjust the brackets or frames vertically, yielding or elastic means to cause the cutter-heads to advance toward the jack, and means to withdraw the cutter-heads from the jack.

23. The combination of a turret, including a turntable adapted to rotate intermittently through predetermined arcs, jacks carried by said turntable and having independent and reversible axial rotation thereon, mechanism carried in part by the turret by which the jacks as they occupy predetermined relative positions on the turntable may be axially and oppositely rotated while the turret is at rest, and means by which the jack turning mechanism carried by the turret may be caused to effect the further rotation of the jacks in the immediately preceding direction of their rotation while the turret is in motion for the purpose of repositioning them.

24. In a heel turning machine, the combination of a turret, a series of work-carrying jacks arranged on said turret, means to intermittently rotate the turret so as to present the jacks at different points in the cycle of movement, means operative during the rest intervals of the turret to rotate the individual jacks positively and independently when opposite the aftermentioned cutter-heads and to turn one of them to the right and another to the left while the turret is at rest and thereafter to continue such turning while the turret is in motion, and a pair of independent cutter-heads for successively operating on opposite sides of the work in the jacks from breast to back.

25. In a heel turning machine, the combination of a turret, a series of work-carrying jacks arranged on said turret, means to intermittently rotate the turret in one direction so as to present the jacks at different points in the cycle of movement, means to temporarily hold said turret with the jacks at such points, means operative during the rest intervals of the turret to independently and oppositely rotate those jacks which for the time being are presenting the work to be cut to the aftermentioned cutter-heads, and independent cutter-heads for simultaneously operating on opposite sides of independent pieces of work carried by said jacks.

26. In a heel turning machine, the combination of a turret, a series of work-carrying jacks arranged on said turret, means to intermittently rotate the turret so as to present the jacks at different points in the cycle of movement, means to temporarily hold said turret with the jacks at such points, means operative during the rest intervals of the turret to independently and oppositely rotate those jacks which are opposite the aftermentioned cutter-heads while the work is being cut, independent cutter-heads for simultaneously operating on opposite sides of separate pieces of work carried by said jacks and by them turned so as to present the work for cutting from breast to back, and means to adjust the jacks with relation to the cutter-heads.

27. In a machine for making wooden heels for boots and shoes, the combination of a series of rotary jacks, a pair of cutter-heads, means for simultaneously presenting the cutter-heads in apposition to juxtaposed jacks for acting upon opposite sides of blanks in said jacks, means to move the respective jacks so as to present one side of the heel blank to one cutter-head to permit it to be cut from breast to back with the grain and then turn the blank to present the other side to the other cutter-head likewise to be cut with the grain from breast to back, and a cast-off mechanism part of which is fast to and moves with the mechanism of the cutter-heads and the other part of which is fast to and turns with the mechanism of the jacks and operates to move the cutter-head away from the blank as the back of the blank is presented.

28. In a machine for making wooden heels for boots and shoes, the combination of an intermittently rotating turret, a series of rotary jacks carried by said turret, a pair of cutter-heads, means for simultaneously presenting the cutter-heads in apposition to two jacks for acting upon opposite sides of blanks in said jacks, and means to move the respective jacks so as to present one side of a blank in a jack to one cutter-head and cause said jack to turn the blank from breast to back and then continue its motion in the same direction while the turret is rotating to carry the said jack toward the second cutter-head and thereby present the opposite side of the blank to the other cutter-head and when so presented to turn the last-mentioned side of the blank relative to the second cutter-head to cause it to be cut from breast to back.

29. In a heel turning machine, the combination of a turret, a series of heel blank carrying jacks arranged on said turret, means to intermittently rotate the turret in one direction so as to present the jacks at different points in the cycle of movement, means to temporarily hold said turret with the jacks at such points, means operative during the rest intervals of the turret to independently rotate those jacks which for the time being are in apposition to the aftermentioned cutter-heads in relatively opposite directions on their own axes while the work is being cut, and independent cutter-heads also revolving in relatively opposite directions for successively operating on opposite sides of the heel blank from breast to back.

30. In a heel turning machine, the combination of a turret, a series of heel blank carrying jacks arranged on said turret, means to intermittently rotate the turret in one direction so as to present the jacks at different points in the cycle of movement, means to temporarily hold said turret with the jacks at such points, means operative during the rest intervals of the turret to independently rotate those jacks which for the time being are in apposition to the aftermentioned cutter-heads in relatively opposite directions on their own axes while the work is being cut, independent cutter-heads also revolving in relatively opposite directions for successively operating on opposite sides of the heel blank from breast to back, and means to adjust the jacks with relation to the cutter-heads.

31. The combination of a turret, a series of blank-holding jacks arranged on said turret, means to intermittently rotate the turret to present the jacks at different points in the cycle of movement, means to temporarily hold said turret with the jacks at such points, means to independently rotate the several jacks, means to move said jacks longitudinally of their axes, means to incline them relatively to their axes, cutter-heads for successively operating on opposite sides of each blank in the jacks, and means for rotating those jacks on their own axes in relatively opposite directions which are in juxtaposition with the cutter-heads to simultaneously form or turn opposite sides of their respective blanks while the turret is at rest.

32. The combination of a turret, a series of blank-holding jacks arranged on said turret and having spindles on which they are pivotally mounted, means to intermittently rotate the turret to present the jacks at different points in the cycle of movement, means to hold the turret with the jacks at such points temporarily, means to rotate the jacks independently of the turret rotation, means to change the angle of inclination of the jacks relatively to the cutter-heads during the cutting operation, cutter-heads for successively operating on opposite sides of the blanks in those jacks at that time opposite the cutter-heads, and means for rotating said jacks on their own axes in relatively opposite directions while in juxtaposition with the cutter-heads to simultaneously form or turn opposite sides of their respective blanks while the turret is at rest.

33. The combination of a turret, a series of blank-holding jacks arranged on said turret and having spindles on which they are pivotally mounted, means to intermittently rotate the turret to present the jacks at different points in the cycle of movement, means to hold the turret with the jacks at such points temporarily, means to rotate the jacks independently of the turret rotation, means to move the spindles lengthwise, means to move the jacks on their pivots while their spindles are moving lengthwise, cutter-heads for successively operating on opposite sides of the blanks in the jacks, and means for rotating the jacks on their own axes in relatively opposite directions while in juxtaposition with the cutter-heads to simultaneously form or turn opposite sides of their respective blanks while the turret is at rest.

34. In a heel turning machine, the combination of a turret, a series of work-carrying jacks arranged on said turret, means to intermittently rotate the turret in one direction so as to present the jacks at different points in the cycle of movement, means to temporarily hold said turret with the jacks at such points, means operative during the rest intervals of the turret to independently and oppositely rotate those jacks which at the time are opposite the aftermentioned cutter-heads, and independent cutter-heads for successively operating on opposite sides of the work from breast to back.

35. In a heel turning machine, the combination of a turret, a series of work-carrying jacks arranged on said turret, means to intermittently rotate the turret in one direction so as to present the jacks at different points in the cycle of movement, means to temporarily hold said turret with the jacks at such points, means operative during the rest intervals of the turret to independently and oppositely rotate those jacks then opposite the aftermentioned cutter-heads, independent cutter-heads for successively operating on opposite sides of the work from breast to back, and means to adjust the jacks with relation to the cutter-heads.

36. In a heel turning machine, the combination of a turret, a series of work-carrying jacks arranged on said turret, means to intermittently rotate the turret in one direction so as to present the jacks at different points in the cycle of movement, means to temporarily hold said turret with the jacks at such points, means operative during the rest intervals of the turret to independently rotate those jacks then opposite the aftermentioned cutter-heads in relatively opposite directions on their own axes while the work is being cut, and independent cutter-heads also revolving in relatively opposite directions for successively operating on opposite sides of the work from breast to back.

37. In a heel turning machine, the combination of a turret, a series of work-carrying jacks arranged on said turret, means to intermittently rotate the turret in one direction so as to present the jacks at different points in the cycle of movement, means to temporarily hold said turret with the jacks at such points, means operative during the rest intervals of the turret to independently rotate those jacks at the time opposite the aftermentioned cutter-heads in relatively opposite directions on their own axes while the work is being cut, independent cutter-heads also revolving in relatively opposite directions for successively operating on opposite sides of the work from breast to back, and means to adjust the jacks with relation to the cutter-heads.

38. The combination of a turret, a series of blank-holding jacks arranged on said turret, means to intermittently rotate the turret to present the jacks at different points in the cycle of movement, means to temporarily hold said turret with the jacks at such points, means to independently rotate the several jacks, cutter-heads for successively operating on opposite sides of the blanks in the jacks, means for rotating those jacks then opposite the cutter heads on their own axes in relatively opposite directions to simultaneously form or turn opposite sides of their respective blanks while the turret is at rest, and means to collectively and properly re-position the jacks while the turret is in motion.

39. The combination of a turret, a series of blank-holding jacks arranged on said turret, means to intermittently rotate the turret to present the jacks at different points in the cycle of movement, means to temporarily hold said turret with the jacks at such points, means to independently rotate the several jacks, a pair of cutter-heads for successively operating on opposite sides of the blanks in the jacks, means for rotating two jacks on their own axes in relatively opposite directions while in juxtaposition with the cutter-heads to simultaneously form or turn opposite sides of their respective blanks while the turret is at rest, and means for changing the angle of inclination of these jacks with respect to the cutter-heads during the cutting operation.

40. The combination of a stationary cam provided with vertically disposed grooves or slideways on opposite sides and with circumferential cam grooves on opposite sides, each groove extending from one slideway to the other, slides arranged in said slideways and each provided with a transverse groove to register with the circumferential cam grooves, means for moving said slides to cause their grooves to register with the cam grooves, a shaft extending through the cam, a turntable mounted on said shaft, work-holders mounted on said turntable and carried with it, a cage secured to said turntable and surrounding the cam and provided with a plurality of slideways, racks arranged in the slideways in said cage and provided with means to engage the cam grooves in the stationary cam, means to intermittently and periodically rotate the turntable through predetermined arcs, means to automatically lock the turntable and to release it on the recurrence of its periods of movement, and means connecting the racks and work-holders to convert the reciprocating motion of the racks into a rotary reciprocating motion of the work-holders, the said racks being reciprocated by the circumferential cam grooves while the turntable is in motion and by the slides in the slideways while the turntable is at rest.

41. In a heel turning machine, the combination of an intermittently rotated turret, a series of oppositely disposed jacks mounted upon and turning with the turret, means for independently rotating the several jacks periodically comprising a stationary cam having cam-grooves at different altitudes, toothed racks arranged substantially normal to the cam-grooves, means for operatively connecting said racks with the said cam-grooves, gearing interposed between the jacks and racks, and means for predeterminedly shifting the opposite toothed racks from the cam-groove of one altitude to the cam-groove of another altitude whereby the jacks may be rotated and the heels formed while the turret is at rest.

42. The combination of a turntable, means for intermittently rotating said turntable, jacks mounted upon and carried with the turntable, means for positively rotating said jacks including spindles, gearing for rotating the spindles and means to actuate the gearing comprising a stationary cam having cam-grooves, toothed racks interposed normally between said cam-grooves and said gearing and operated by the cam-grooves and operating the gearing, and means for transferring certain racks from one cam-groove to another including a rock-lever and slides connected with and operated by said rock-lever and having transversely arranged grooves to engage the racks at predetermined times.

43. In a machine for making wooden heels for boots and shoes, the combination of an intermittently rotating jack-carrier having a series of jacks arranged to operate in couples with respect to the aftermentioned cutter-heads, a pair of rotary cutter-heads, means to cause the cutter-heads to advance toward and then recede from the jacks, yielding means interposed in the connections between the cutter-heads and their advancing and receding means, a push-off cam on each jack turning with it, and a stationary buffer moving with each cutter-head with which the push-off cams on the jacks successively come into contact to position the cutter-heads with respect to the jacks.

44. In a machine for making wooden heels for boots and shoes, the combination of an intermittently rotating turret, jacks carried by said turret and having independent axial rotation, each of said jacks having a jack-lever on which the blank is supported, a base on which the jack-lever is pivoted, a cam-track traversed by the lever and a second cam-track traversed by the base as the jack is rotated on its axis, and a jack-head rigidly applied to the jack-lever and carrying a work-clamping mechanism.

45. In a machine for making wooden heels for boots and shoes, the combination of an intermittently rotating turret, jacks carried by said turret and having independent axial rotation, each of said jacks having a jack-lever on which the blank is supported, a base on which the jack-lever is pivoted, a cam-track traversed by the lever and a second cam-track traversed by the base as the jack is rotated on its axis, and a jack-head rigidly applied to the jack-lever and carrying a work-clamping mechanism, the blank support having a gage, and a fixed side gage applied to a stationary part of the machine and located thereon opposite the point where the work is inserted in the jack.

46. In a machine for making wooden heels for boots and shoes, the combination of an intermittently rotating turret, jacks carried by said turret and having independent axial rotation, each of said jacks having a jack-lever on which the blank is supported, a base on which the jack-lever is pivoted, a cam-track traversed by the lever and a second cam-track traversed by the base as the jack is rotated on its axis, and a jack-head rigidly applied to the jack-lever and carrying a work-clamping mechanism, said jack-head adjustably mounted upon the jack-lever.

47. In a machine for making wooden heels for boots and shoes, the combination of a rotary turret, a series of four blank carrying jacks mounted upon and turning with said turret, independent means for axially turning opposite jacks in opposite directions so as to present first one side of a blank to one cutter-head and then the other side of the blank to the other cutter-head while the turret is at rest and the jacks rotating, a pair of oppositely arranged rotary cutter-heads, means to arrest the turret periodically with two jacks opposite said cutter-heads, brackets in which the cutter-heads are mounted to rotate, and means to move the brackets and the cutter-heads toward and from the jacks.

In testimony whereof I have hereunto set my hand this twentieth day of July A. D. 1916.

JOHN GEORGE POOL.

Witnesses:
CHAS. G. WOODBRIDGE,
ERNEST A. HODGDON.